United States Patent [19]
Hoffert et al.

[11] 3,953,180
[45] Apr. 27, 1976

[54] PRODUCTION OF LOW BTU SULFUR-FREE GAS FROM RESIDUAL OIL

[75] Inventors: Franklin D. Hoffert, Mountainside; Harold H. Stotler, Westfield, both of N.J.

[73] Assignee: Hydrocarbon Research, Inc., Morristown, N.J.

[22] Filed: July 11, 1974

[21] Appl. No.: 487,718

[52] U.S. Cl.................... 48/215; 48/196 R; 48/197 R; 55/79; 55/390; 208/161; 208/169; 208/175
[51] Int. Cl.² ............................. C10G 13/30
[58] Field of Search ............ 48/215, 197 R, 196 R; 208/165, 169, 171, 175, 161, 48 R; 23/288; 55/77, 79, 390

[56] References Cited
UNITED STATES PATENTS
3,177,631  4/1965  Tamura.................... 55/79

FOREIGN PATENTS OR APPLICATIONS
665,781  1/1952  United Kingdom............ 48/197 R

*Primary Examiner*—Robert L. Lindsay, Jr.
*Assistant Examiner*—George C. Yeung

[57] ABSTRACT

An effective and economical supply of energy from residual oil for power generation can be obtained by a sequential process of partial combustion of a crude or residual oil such as Bunker C and other high sulfur stocks, in the presence of air and steam in a fluidized bed of inert particles followed by a fluidized bed heat exchange for the production of steam and control of solids build-up, the solids-free gas being desulfurized by commerical processes and thence being available for combustion for gas turbine operation to produce transportable electrical power or other types of mechanical power such as a compressor driver. Emission levels of contaminants are within forseeable requirements and turbine maintenance problems are reduced. Coal solids can be used as a supplement to the residual oil. Alternatively, the low BTU gas can be effectively added to pipeline gas as a supplementary source of energy when dilution of high-Btu gas is permitted or used directly as a low-Btu desulfurized industrial fuel.

12 Claims, 3 Drawing Figures

PRODUCTION OF LOW BTU SULFUR-FREE GAS FROM RESIDUAL OIL

BACKGROUND OF THE INVENTION

The gasification of heavy oils in an oxidationcracking mechanism in the presence of steam and oxygen, particularly high purity oxygen of 90 percent quality or higher, is well known. An example is the Schuman U.S. Pat. No. 2,875,150. Heretofore, however, the products sought have frequently been in the gasoline boiling range or high BTU gas. Catalysts were commonly required and several stages of gasification and contact, in a fluidized bed of solids, were used. Regeneration of solids with continued recycle of large masses of solids and reforming operations have also been disclosed. Other typical patents are Hubman U.S. Pat. No. 2,094,946; Finneran No. U.S. Pat. No. 2,861,943; and Woebcke U.S. Pat. No. 2,861,631.

It is now recognized that the current sources of fuel in the nature of residual oils are becoming more expensive to treat due to the contaminants of sulfur and organo-metallic compounds contained therein. High sulfur residual oil cannot normally be burned in industrial areas unless treated to remove sulfur at a prohibitively high cost. Low sulfur oil is available only at a premium cost. Current limitations, and prospective future more drastic limitations, by anti-pollution agencies in many areas limit the operations of gas turbines and/or boilers to liquid fuels having less than 0.3 wt. percent sulfur. This low level of sulfur is generally available only in light distillate type liquid fuels which are in increasingly short supply.

SUMMARY OF THE INVENTION

This invention pertains to the production of low heating valve gas from residual oils containing sulfur. Product gas having a heating value in the range of 150–300 Btu/SCF is produced by the sequential gasification and partial combustion of crude or residual oil in the presence of air and steam in at least two fluidized beds of inert particles. The second bed is cooled by an external fluid, usually water or effluent gas, to promote the accumulation of the carbon fines therein. The product gas then passes through solids removal and desulfurization steps, and is suitable for burning in a gas turbine for power generation. A portion of the compressed air from the gas turbine compressor may advantageously be withdrawn and used to supply the combustion air to the fluidized bed operating at high temperature. The resulting product gas is scrubbed and desulfurized, and may then be burned in a gas turbine unit for the generation of power, or directly as plant fuel.

The advantage of using high sulfur oils of the residual type as feed stock would be of greater economic value if the costs of treating were reduced. Utilizing such oils in a gasification system as hereinafter described is considered to be one of the least expensive add-on costs considering the need of large amounts of power over long periods of time. The fluidization technique in the presence of relatively inert and inexpensive solids is used for gasification and conversion. This technique is also used for cooling the gases to make steam. An added feature, however, is the substantially complete removal of all particles by such cooling step. There is no need for complicated circulating of beds from one zone to another and the initially applied pressure carries through to the final gas product. All features have been separately demonstrated but the particular combination of steps resulting in the particular composition of gas has not previously been disclosed. Coal supplements may be used. The process thermal efficiency based on the total heat in the recovered products compared to the total heat input is approximately 90%. The cold oil to gas thermal efficiency at 60°F is in excess of 83%. This materially reduces the heat rejection to cooling water thus avoiding water pollution.

PREFERRED FORM OF EMBODIMENT

Figure 1:
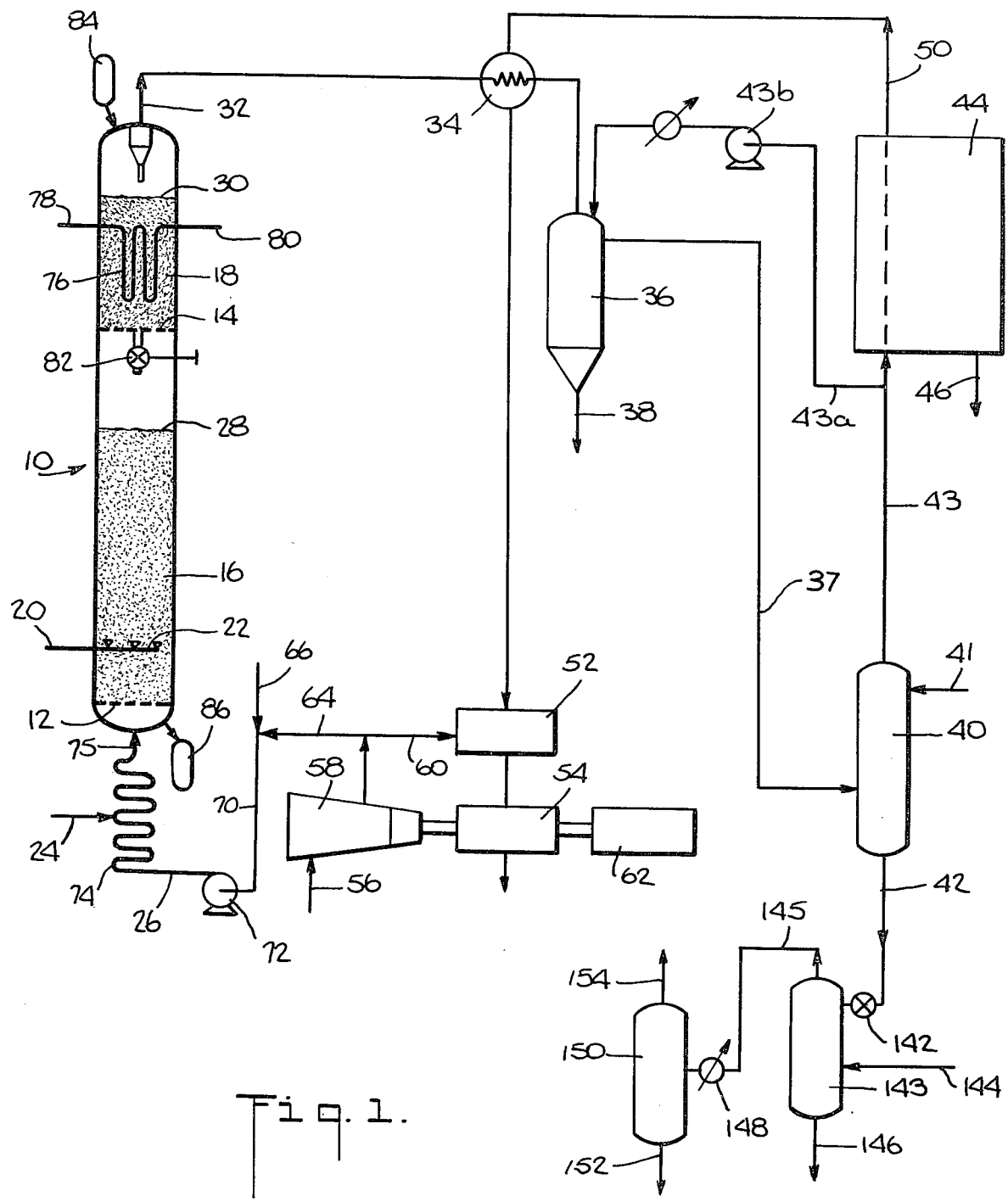
FIG. 1 is a schematic view of the principal elements of the process based on the use of residual oil.

As illustrated by FIG. 1, the gasification reactor 10 has a lower grid plate 12 and an intermediate grid plate 14 for the purpose of supporting the separate lower bed 16 and the upper bed 18 each of which contains particular material which will be maintained in a fluidized or disperse phase by the upflowing gaseous material. A residual oil feed 20 is introduced through a distributor or sparger 22 into the lower bed 16. Steam at 24 and air at 26 pass upwardly through lower bed 16 and will react with the oil to form a gaseous mixture that provides the fluidizing force, the upward velocity of these vapors and gases being such that the lower bed appears to have a solids level 28 located somewhat below the intermediate grid plate 14.

The vapors and gases from bed 16 continue upwardly through the intermediate grid plate 14 and fluidize the second or upper bed 18 which has an apparent solids level at 30. The resulting gases and vapors are removed at 32, cooled by heat exchange at 34, filtered at 36 and the resulting fines are removed at 38. The net gases and vapors at 37 are then passed through a scrubber 40 for further cooling counterflow to water entering at 41 with removal of waste water at 42. The waste water 42 from the scrubber 40 is depressurized in valve 142 to tank 143 to which steam is added at 144. $H_2S$ is removed overhead at 145 and waste water, with tolerable levels of $H_2S$ is removed at 146. Vapors from tank 143 are further cooled and condensed in exchanger 148 and sent to tank 150. The condensate at 152 and vapors at 154 are sent to the sulfur recovery unit where any $H_2S$ is oxidized to sulfur.

The saturated gases and vapors at 43 from scrubber 40 then pass through a commerical sulfur removal step 44. This may be of the Stretford type which oxidizes the $H_2S$ to sulfur and water. The sulfur compound such as $H_2S$ is removed at 46 as sulfur and becomes a valuable by-product. COS, if present, is removed in a separate unit. The sulfur removal unit will also tend to separate out any fines which may have passed the filter and scrubber. A part of the gas 43 leaving the scrubber 40 may be used at 43a after recompression at 43b as blowback for the filter 36.

The product gas 50, containing less than 50 ppm $H_2S$ and having been treated three times for solids removal is now reheated in exchanger 34 and is available at 400°F and 280 psia for combustion in burner 52 adjacent to gas-turbine 54. In a typical manner, inlet air at 56 will be compressed by compressor 58 which is an integral part of the gas-turbine with the high pressure air stream 60 entering burner 52. The turbine 54 will not only drive the integral compressor 58 but will also generate power in generator 62.

A feature of the invention is the use of moderate pressure air at 64 from compressor 58 to supply the air required at 26 for the initial gasification in first bed 16 of reactor 10. Condensate is preferably added to the compressed air stream at 66 to desuperheat the air and the air and steam mixture at 70 is further pressurized by a booster compressor 72. A heater 74 for the air and steam supply to reactor 10 will permit desired temperature control of the reactor gases and vapor. Saturated steam at 24 may be added to the air at 26.

The upper fluidized bed 18 is provided with a heat exchanger 76 for generating steam from boiler feed water at 78 and provides steam at 80 for operating utilities such as the drive for booster compressor 72. This heat exchanger also serves as a highly effective means for cooling the upper bed 18 which will, in turn, trap the ultra-fine particles of carbon therein and increase their concentration in bed 18. A portion of the upper bed 18 can be slowly dropped downwardly through the valve 82 to the lower bed 16 so that carbon plus inert solids can be recycled in this manner. Makeup of particulates is controlled from hopper 84 and the lower bed particulates are removed to hopper 86.

OPERATING CONDITIONS

With a typical full boiling range residual oil feedstock such as Kuwait having a sulfur composition of about 5.5 wt. percent, and an API gravity of about 7°, the temperature in the lower fluidized bed 16 is maintained in the general range of 1600°–2000°F which is below slagging temperature. Pressures are normally in the range of 200 to 400 psig and preferably 300 psig or higher.

The heat exchange in the upper bed 18 is such that the temperature of the gases leaving the upper bed 18 is about 500° to 800°F with the outlet temperature at 32 of about 645°F when making steam at a pressure of 400–500 psig. After heat exchange at 34, the temperature of the gas entering the filter 36 is about 360°F and after passing through the scrubber 40 the gas as it enters the sulfur removal unit 44 is at about 110°F. This product gas then is reheated in heat exchanger 34 to about 400°F and it is at approximately 270–280 psig pressure as it reaches the combustor-burner 52.

Depending upon feed composition and operating temperature a range of product gas compositions stream will be, on a dry basis:

| | |
|---|---|
| Hydrogen | 17 – 22% |
| CO | 23 – 26% |
| $CO_2$ | 2.7 – 5.4% |
| COS | 100 – 300 ppm |
| $CH_4$ | 4 – 7% |
| $N_2$ and A | 45 – 51% |
| $H_2S$ | 0.3 – 0.6% |
| Calorific Value - Approximately 150 – 300 BTU/SCFHHV (dry). | |

A typical gas analysis on a dry basis of the desulfurized product gas at stream 50 after selective removal of hydrogen sulfide is:

| | |
|---|---|
| $H_2$ | 18.2 |
| CO | 21.0 |
| $CO_2$ | 5.1 |
| COS | 300 ppm |
| $CH_4$ | 4.8 |
| $N_2$ and A | 50.4 |
| $H_2S$ | 50 ppm |
| Lower Heating Value | 162.5 BTU/SCF (dry) |
| Higher Heating Value | 176.5 BTU/SCF (dry) |
| Molecular weight | 23.4 |

For the purpose of this invention, the inexpensive particulate solids in beds 16 and 18 may be sand or activated alumina such as Porocel. Sand is relatively inert and Porocel is considered slightly absorbent.

A further significant feature of the invention is maintaining a hydrogen partial pressure in the reactor 10 such that the bulk of the sulfur is converted to a reduced and readily removable form, such as $H_2S$, with a minimal yield of carbonyl sulfide as a co-product. This is accomplished by the addition of sufficient steam at 24 and condensate at 66 to air stream 56.

The foregoing features, together with the use of a common reactor 10, and the utilization of the same (or similar) inert solids in both zones 16 and 18, with a substantially common pressure system, and without cumbersome solids recycle systems materially reduces the cost of conversion of the low grade liquid hydrocarbons into the highly effective, low sulfur solids free gas. The system is substantially balanced from the standpoint of heat transfer and pressure and the yields of powder steam and sulfur further reduce the add-on costs of the conversion. An efficiency of heat utilization from cold oil to low BTU gas is found to exceed 83%. This is based, in part, on the use of export steam at 80 in the operation of the system.

A series of factors assure reduction in $NO_x$ levels. Since the oil feed to the gasifier is subjected to a reducing atmosphere, any nitrogen compounds in the oil do not break down to form oxides of nitrogen. The beneficial effect of steam or water injection in reducing $NO_x$ formation is also recognized. And in the turbine combustor the flame temperature when firing low BTU gas is considerably below the flame temperature associated with natural gas and distillate fuels and therefore less nitrogen is thermally reacted to form oxides. $SO_2$ emissions are also below known requirements of environmental agencies.

Figure 2:
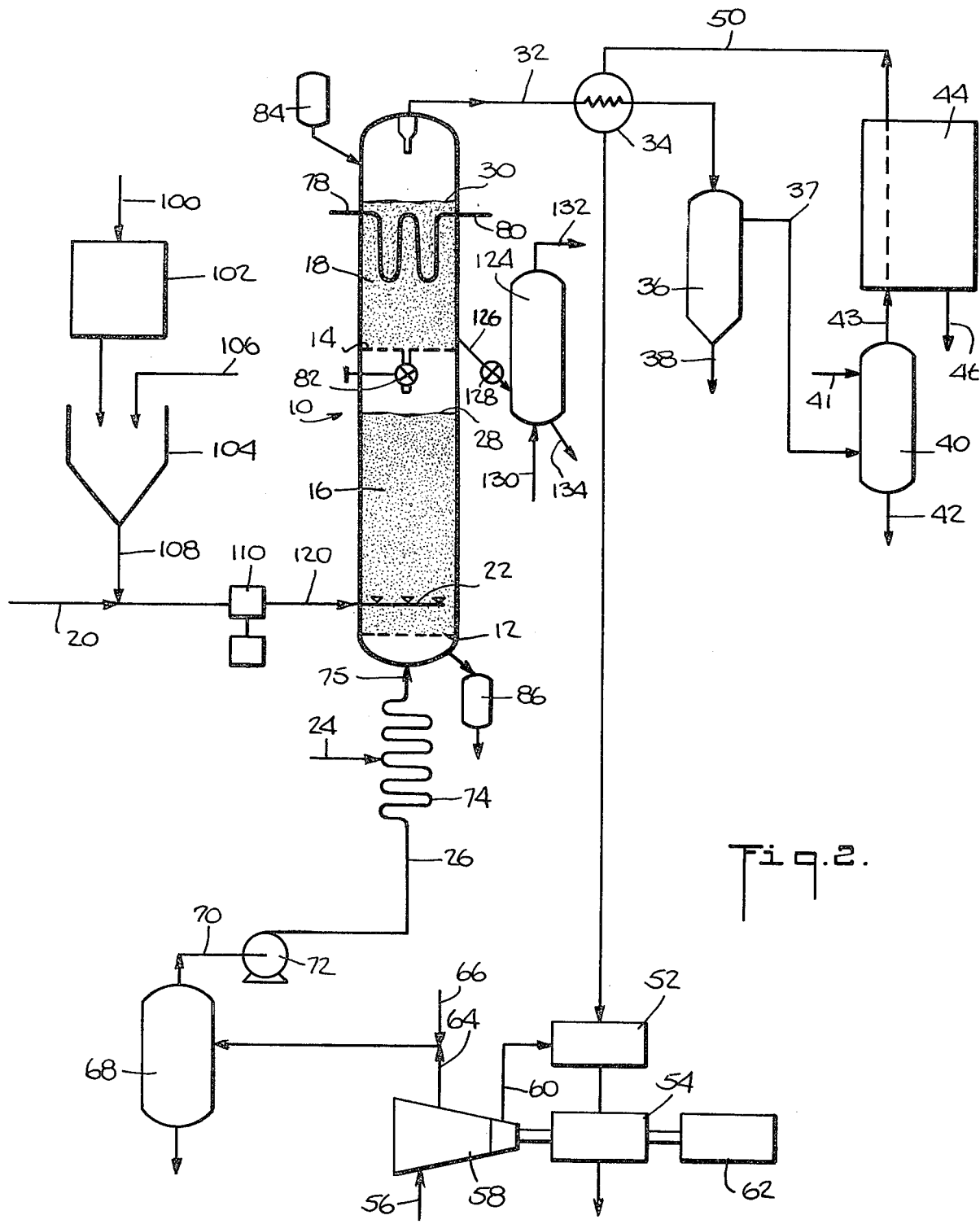
FIG. 2 is a modification of FIG. 1 adapted to the utilization of residual oil with a coal supplement.

A modified form of embodiment of our invention, which may also be preferred under some circumstances, is more particularly shown in FIG. 2 wherein the elements of equipment which are functionally similar to those in FIG. 1 are indicated by the same name and item number. This modification is particularly applicable to the use of solid fossil fuel such as one of the forms of coal as a substantial supplemental fuel source. If desirable, coal alone can be used, however, it is usually found most convenient to use a coal-oil slurry as hereinafter set forth as it is most readily transported through typical pipes and pumps.

From a process standpoint, the coal, as a generic term for solid carbonaceous material, at 100 is fed to a preparation unit 102. This unit will have several functions depending on the form and condition of the coal received but primarily it is a grinding operation so that the feed will be of a substantially uniform size. Grinding techniques, as now known, usually require drying the coal to a relatively low surface moisture content but the drying of the coal to a very low inherent or chemically bound moisture content is not necessary herein. Hence, there are economies in the coal preparation step when total drying is not required. We use the inherent moisture in the coal feed to provide a portion of the chemically reacting water vapor within the reactor. This is thus a unique feature of this invention.

In the mixer 104, the prepared coal and oil at 106 are properly mixed to form a slurry discharged at 108. The slurry oil selected will usually be a residual oil of the same general type as the feed oil 20 referred to with respect to FIG. 1 some of which directly enters feed line 120. The amount of slurry oil, with respect to coal is a function of the maximum amount of solids that can be pumped to the reactor and the desired amount that may satisfy operating conditions within the reactor. We have found that we can continuously feed one part by weight of coal to 1.5 parts by weight of oil. However, we also are aware of reactor operating conditions wherein ratios of as much as ten pounds of oil per pound of coal may be necessary. The range of slurry oil to coal is thus expressed as from 1.5 to one to as high as ten to one.

The coal-oil slurry 108, and feed oil 20 suitably pressurized at pump 110, now becomes the fuel feed 120 to the reactor 10. As previously described, the reactor 10 has a lower grid 12 and an intermediate grid 14 for the purpose of supporting separate beds 16 and 18 of particulate material which will be maintained in a fluidized or disperse phase by the upflowing gaseous material. The fuel feed at 120 is introduced through a distributor or sparger 22 into the lower bed 16 and steam at 24 and air at 26 will react with the fuel to form a gaseous mixture that will provide the fluidizing force. The upward velocity of these vapors and gases is such that the lower bed appears to have a solids level 28 somewhat below the intermediate grid 14.

The vapors and gases continue upwardly through the intermediate grid 14 and fluidize the upper bed 18 which has an apparent solids level 30. The resulting gases and vapors are removed at 32, cooled by heat exchanger at 34, filtered at 36 and fines are removed at 38. The net gases and vapors at 37 are then passed through a scrubber 40 for further cooling countercurrent to fresh water introduced at 41 with the removal of waste water at 42. This waste water may be treated as described with respect to FIG. 1. The saturated gases and vapors 43 then pass through a commerical sulfur removal step 44 from which the sulfur compound such as $H_2S$ is removed at 46. COS, if present, will be separately removed. The product gas 50 of low sulfur content (below 0.3 wt. %) after reheating at 34 is then available for combustion at 52 as hereinafter outlined.

The turbine 54, driven by the hot gas from burner combuster 52, in turn drives integral compressor 58 for compressing air at 56 to a sufficiently high pressure at 60 to serve the burner combuster 52. The turbine 54 also drives the generator 62 for the production of electrical power.

A feature of the invention, as heretofore disclosed, is the use of moderate pressure air removed from the compressor at 64 and to which condensate is added at 66 to desuperheat the air at 68 prior to compression in compressor 72. As will be appreciated, this is of particular importance in the case of coal drying as the addition of even more moisture overcomes the need for strictly dry coal. Also, as previously pointed out, the steam-air mixture passes through a surge drum 68, booster-compressor 72 and heater 74 before entering the reactor 10 as stream 75. Steam 24 may also be added at the heater.

In the gasification of a coal-oil slurry mixture there have proved to be several problems resulting from the presence of solid contaminants including but not limited to coal ash, organo-metallic materials including vanadium, and carbon fines. With the desired presence in the fluidized beds of a particulate material such as activated alumina or sand to aid heat transfer and facilitate gasification, there are several forms of agglomeration that take place. Any agglomerant that proceeds to the combustor 52 can have an adverse effect on the gas turbine and hence must be removed from the reactor. While provision is made for purging of the beds by removal at hopper 86 and replenishment at hopper 84 hereinbefore described, there is a need for a continuous withdrawal of carbon fines and fly ash resulting from the utilization of the coal.

We have thus also provided an elutriator 124 which is continuously operated by a small or slip stream 126 under control of valve 128 to draw off a portion of the particles in the upper fluidized bed 18. By the use of a controlled velocity of gas supplied at 130, the very light carbon fines can be removed overhead at 132 and ash removed at 134. It will be apparent that some of the fluidized bed particulate matter, Porocel as an example, will also be removed at 134.

An explanation for the concentration of fines in the upper bed 18 is based on the observed phenomena, sometimes called thermophoretics of deposition of fine materials by cooling of the gaseous solids-bearing streams. The temperature transition of the gaseous solids-bearing stream in traversing grid-deck 14 is rapid and the fine particles entering the upper bed 18 are randomly influenced by Stokes Law affecting settling velocity $$V = k D^2 \frac{e_s - e_f}{u}$$

where:
$V$ = settling velocity of the particles
$k$ = a constant
$D$ = diameter of the particles
$e_s$ = particle density
$e_f$ = fluid density
$u$ = fluid viscosity It can be seen that a decrease in the temperature of the system will markedly increase the settling velocity of a particle since temperature affects the terms $e_f$ and $u$ and thereby increase the concentration of particles in the upper bed. A comparison of the settling velocity V for reactor conditions below and above the intermediate grid plate 14 has been calculated to show that for a given particle size, with the temperature below and above the grid set respectively at 1800°F and 600°F, the settling velocity will be:
V (below grid) = 10 ft/sec.
V (above grid) = 18 ft/sec.
This effect is due principally to the nearly two-fold change in gas viscosity with temperature. This increased concentration of fine particles enhances the operation of elutriator 124. The above phenomena is also applicable to the removal of the very fine particles as noted in connection with the gasification of oil.

| TYPICAL EXAMPLE | |
|---|---|
| Coal Feed | Wyodak |

TYPICAL EXAMPLE -continued

| | |
|---|---|
| Particle Size | 100% passes 10 mesh |
| Oil to Coal ratio | 3:1 |
| Coal - Inherent moisture | 30% |
| Oil - Kuwait 7°API | 5.5 wt. % S |
| Reactor Pressure | 200–400 psig |
| Lower Bed Temp. | 1600–2000°F |
| Upper Bed Temp. | 500–800°F |

In the foregoing disclosure, emphasis has been placed on the most effective use of low BTU gas from oil or oil and coal to operate a burner-combustor for gas turbines and ultimately to produce transportable electric power. We do contemplate, however, those conditions under which the low BTU gas could be used directly as an industrial fuel.

It is particularly conspicuous from the foregoing that we have reduced emission levels in the gases as well as the waste water to avoid conflict with anti-pollution laws. The system is completely, and economically integrated to utilize all available raw material and produce a very low cost product. This is critical with "bottom of the barrel" feed which normally has the highest concentrations of impurities.

Figure 3:
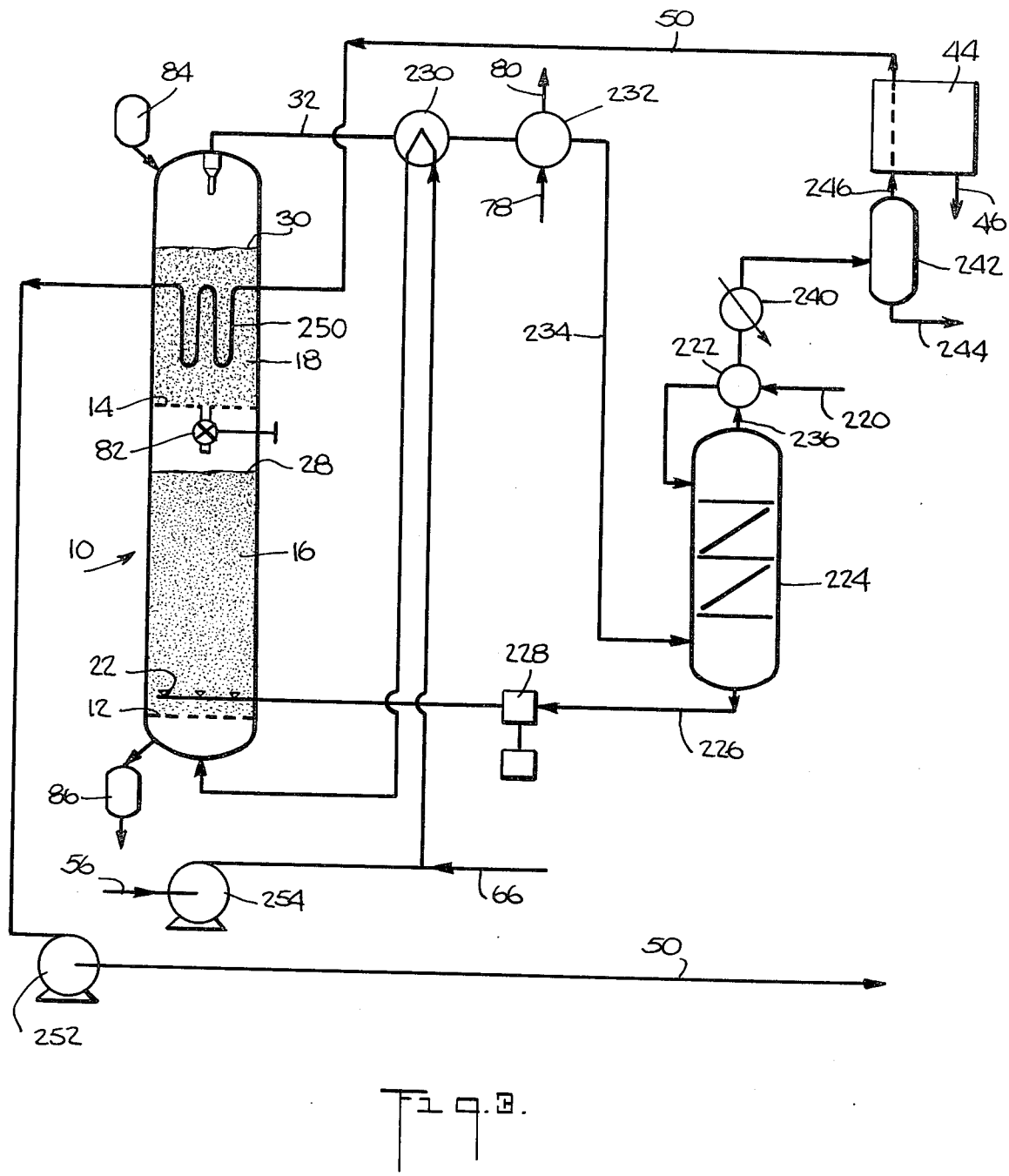
FIG. 3 is a further modification of FIG. 1 for the purpose of producing plant fuel.

The modified form of embodiment shown in FIG. 3 is primarily adapted to make a low BTU gas for plant fuel. The feedstock in this case is a bottoms oil.

The feedstock, at 220, and preferably at a temperature of about 180°F, first passes through a heat exchanger 222 hereinafter described and is further heated in countercurrent carbon absorber 224 to produce a charge stock at 226 which is pressurized by pump 228 for feed into the reactor 10. This reactor is similar in nature to the heretofore described reactor 10. It has a lower grid plate 12 and an intermediate grid plate 14 for the purpose of separating the separate lower bed 16 and the upper bed 18 each of which contains particulate material which will be maintained in a fluidized or disperse phase by the upflowing gaseous material.

The residual oil feed 226 is introduced through a distributor or sparger 22 into the lower bed 16. Air at 56 saturated with water at 66 passes upwardly through the lower bed 16 and will react with the oil to form a gaseous mixture that provides the fluidizing force, the upward velocity of these vapors and gases being such that the lower bed appears to have a solids level 28 located somewhat below the intermediate grid plate 14.

The vapors and gases from bed 12 continue upwardly through the intermediate grid plate 14 and fluidize the second or upper bed 18 which has an apparent solids level at 30. The resulting gases and vapors are removed at 32, cooled by heat exchange at 230 and 232. The net gases and vapors at 234 are then passed through the carbon absorber 224 countercurrent to the inflowing oil at 220 for further cooling and collection of carbon fines in the oil. The saturated vapors 236 from carbon absorber 224 are further cooled in heat exchanger 222 thereby heating the incoming oil. The vapors and gases are then further cooled in exchanger 240 by water and then pass into water collector 242 from which water is drawn off at 244. The substantially solids free gases and vapors 246, now at about ambient temperature go to the commerical sulfur removal step 44 which oxidizes the $H_2S$ to sulfur and water. The sulfur compound such as $H_2S$ is removed at 46 as sulfur and becomes a valuable by-product. COS, if present, is removed in a separate unit. The sulfur removal unit will also tend to separate out fines which may have passed the carbon absorber 224.

The product gas 50, containing less than 50 ppm $H_2S$ and having been treated several times for solids removal is now reheated in heat exchanger 250 in the upper bed 18, to a temperature of approximately 950°F, thereby effectively serving to cool the upper bed, and in turn, also trapping out the ultra-fine particles of carbon therein and increasing their concentration in bed 18. As previously noted, a portion of the upper bed 18 can be slowly dropped downwardly through the valve 82 to the lower bed 16 so that carbon plus inert solids can be recycled in this manner. Makeup of particulates is controlled from hopper 84 and the lower bed particulates are removed to hopper 86.

In a system of this type, it is desirable to take full advantage of the energy in the low BTU gas line 50 by passing it through a hot gas expander 252 not only to reduce the outlet pressure to a range of about 5 to about 20 psig but also to drive air compressor 254 on air feed line 56 and raise the operating pressure in the reactor to about 200–400 psig.

While we have shown and described preferred forms of embodiment of the invention, we are aware that modifications can be made within the scope and spirit of the disclosure and of the claims appended hereinafter. As an example, heat exchange to conserve heat is important to the invention but inter-exchange can be varied to accomplish the most advantageous results. In one case, the upper bed 18 is cooled to make steam. It is also possible, however, to cool the bed with the effluent gas from the sulfur removal unit and make steam from the effluent gas 50.

We claim:

1. The method of producing a low BTU heating value combustible gas of substantially sulfur free character at relatively high pressure and temperature from a sulfur containing low grade oil of the class of crude and residual oil which comprises:
   a. injecting said oil, steam, and air into a first bed of inert particulate matter under conditions to establish fluidization of the particulate matter and under a hydrogen partial pressure such that the oil is gasified and the bulk of the sulfur is converted to hydrogen sulfide with minimal amounts of carbonyl sulfide, the temperature in the bed being in the order of 1600°–2000°F., and the pressure being in the range of 200 to 400 psig;
   b. passing the resulting gases and vapors upwardly through a second bed of inert particulate matter in indirect heat exchanger with a cooling material to reduce the bed temperature to a range of 500° to 1000° F. to accomplish a concentration of ultra fine solid contaminants;
   c. removing said concentrated solid contaminants;
   d. cooling and desulfurizing the effluent gases from the second bed; and
   e. reheating said desulfurized gas, said reheated gas being product gas having a calorific value of under 350 BTU/SCF/(dry) and a sulfur content of less than 0.3 wt.%.

2. The method of claim 1 wherein the cooled gases are filtered of large particles and then scrubbed with water in countercurrent flow.

3. The method of claim 2 wherein the contaminated scrub water is depressurized and steam treated to remove sulfur compounds and the sulfur compounds are oxidized to recover sulfur.

4. The method of claim 1 wherein the heat exchange step in the second bed cools the bed to trap carbon particles therein and generate steam from feed water.

5. The method of claim 1 wherein the heat exchange step in the second bed reheats the desulfurized gas in step (e).

6. The method of claim 1 wherein the particulate matter in step (a) is sand.

7. The method of claim 1 wherein the particulate matter in step (a) is activated alumina.

8. The method of claim 1 wherein the oil is mixed with a solid fossil fuel from the class of coal.

9. The method of claim 8 wherein a stream of solid particles are continuously withdrawn from the upper bed and elutriated to separate carbon fines from ash.

10. The method of claim 8 wherein the coal to oil feed ratio is between 1.5:1 and 10:1.

11. The method of claim 1 wherein the desulfurized product gas is burned in the presence of air for the operation of a gas turbine to provide shaft power with an overall heat utilization of in excess of 83%.

12. The method of claim 11 wherein moderate pressure excess air not used for combustion is cooled by condensate injection then recompressed and injected into the first bed of particulate matter for supply of further compressed air thereto.

* * * * *

UNITED STATES PATENT AND TRADEMARK OFFICE
CERTIFICATE OF CORRECTION

PATENT NO. : 3,953,180
DATED : 27 April 1976
INVENTOR(S) : Franklin D. Hoffert, Harold H. Stotler It is certified that error appears in the above-identified patent and that said Letters Patent are hereby corrected as shown below:

In Column 10, line 4 "coal to oil" should read -- oil to coal --.

Signed and Sealed this

Twenty-fifth Day of January 1977

[SEAL]

Attest:

RUTH C. MASON
Attesting Officer

C. MARSHALL DANN
Commissioner of Patents and Trademarks